May 5, 1953     B. E. O'CONNOR     2,637,514
VIBRATION ABSORBING MOUNT
Filed Feb. 14, 1947     2 SHEETS—SHEET 1
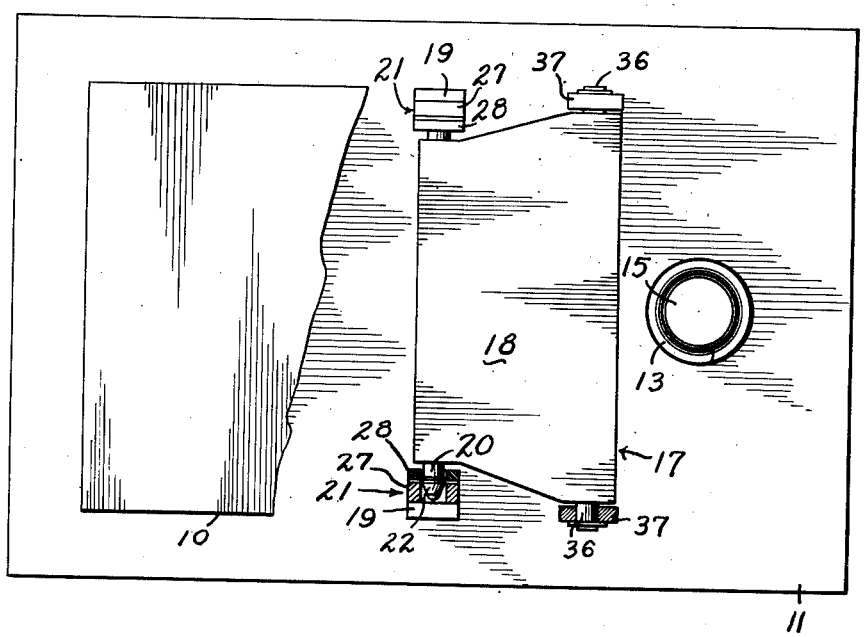
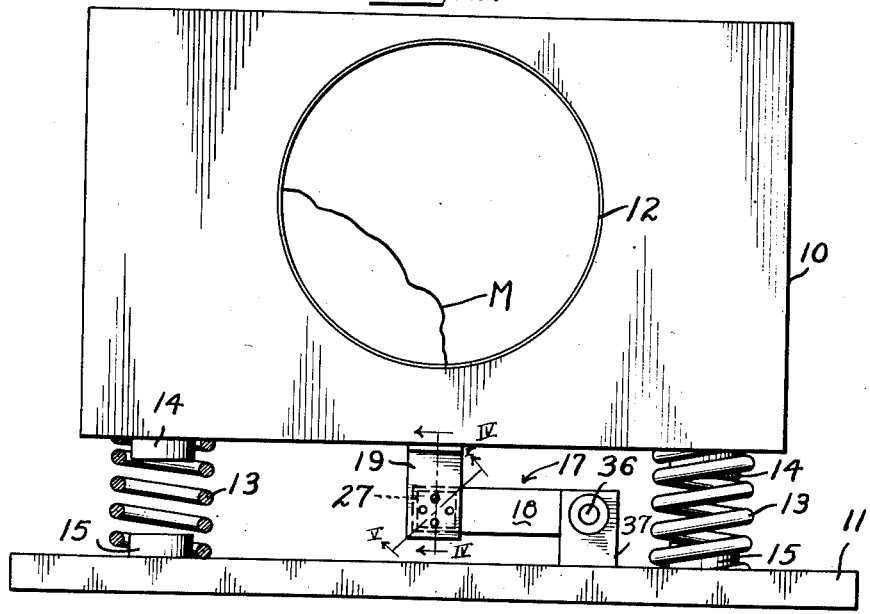
Inventor
BERNARD E. O'CONNOR.

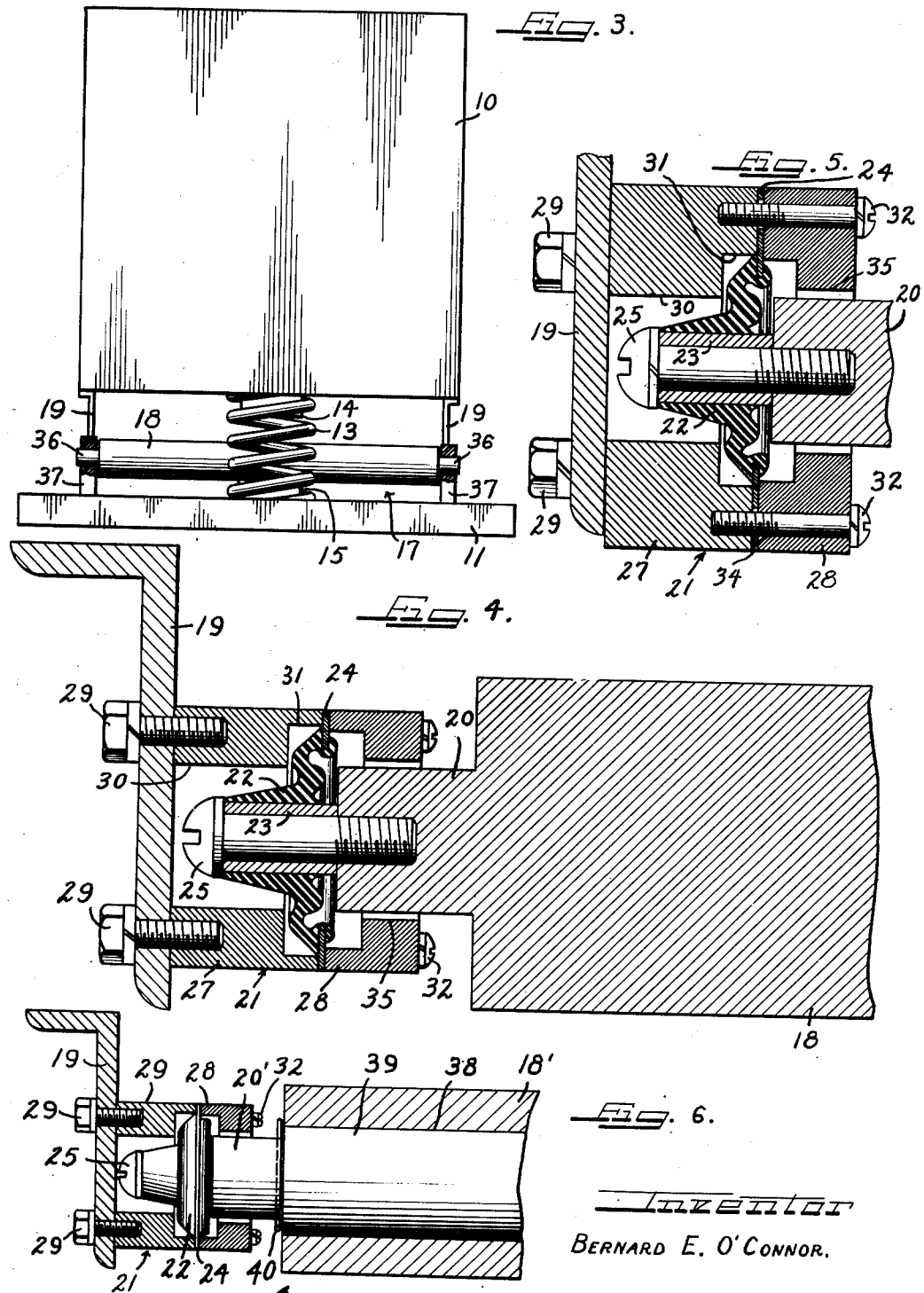

Patented May 5, 1953

2,637,514

UNITED STATES PATENT OFFICE 2,637,514

VIBRATION ABSORBING MOUNT

Bernard E. O'Connor, Buffalo, N. Y., assignor to Houdaille-Hershey Corporation, Detroit, Mich., a corporation of Michigan Application February 14, 1947, Serial No. 728,479

17 Claims. (Cl. 248—21)

This invention relates to improvements in vibration absorbing mounts and more particularly concerns the mounting of apparatus such as machines in a manner substantially to prevent the transmission of vibrations between the apparatus proper and the supporting base therefor.

One of the greatest and most persistent problems facing the users of various types of apparatus under conditions wherein serious vibrations are present is that of absorbing, dissipating or insulating against the vibrations. Such vibrations may be created by the apparatus itself or may be in, or transmitted from an unrelated source to, or through, the base supporting the apparatus. The detrimental and often times dangerous results of such vibration are, of course, well known.

In some instances elaborate and costly suspensions of various sorts have been adopted with more or less success, and all too frequently special heavy bases have had to be provided for certain types of inherently vibratory or vibration sensitive apparatus. The problem has been found especially serious in apparatus subject to the vibrations induced by eccentric rotary loads, particularly where the unbalance of the loads may be variable both in location and magnitude.

An important object of the present invention is to provide a new and improved vibration absorbing mount which will solve the problem of detrimental transmission of vibration between an apparatus and the base or support for such apparatus.

Another object of the invention is to provide a vibration absorbing mount operating on the principle of permitting relative movement of an apparatus and its base against small elastic restraint.

A further object of the invention is to provide a novel vibration absorbing mount wherein the static load of the device to be supported thereby is carried resiliently in an inherently relatively unstable manner but is effectively elastically stabilized.

Still another object of the invention is to provide a novel vibration absorbing mount in which the supported device and its base are permitted freedom of limited relative movement in all directions under the restraints imposed by inertia and a relatively low rate of elastic suspension.

Yet another object of the invention is to provide a simple, low cost, highly efficient vibration absorbing mount which will absorb, dissipate and substantially insulate against vibrations of such magnitude that bases weighing tons have heretofore been deemed necessary to cope therewith.

Other objects, features and advantages of the present invention will be readily apparent from the following detailed description of certain preferred embodiments of the invention taken in conjunction with the following more or less schematic drawings, in which:

Figure 1 is a plan view, partially broken away and in section, showing a vibration absorbing mount in a representative installation;

Figure 2 is a side elevational view, partly in section, of the installation shown in Figure 1;

Figure 3 is an end elevational view of the installation;

Figure 4 is an enlarged fragmentary sectional detail view taken substantially on the line IV—IV of Figure 2;

Figure 5 is an enlarged fragmentary sectional detail view taken substantially on the line V—V of Figure 2;

Figure 6 is a sectional detail view on the order of Figure 4 but showing a slightly modified construction.

A vibration absorbing mount according to the present invention is adapted to be used between a body 10 and a supporting structure or base 11 to support the body upon the base and to absorb vibrations created in or by the body 10 in order substantially to prevent transmission of such vibrations to the base 11, or, on the other hand, to prevent substantially the transmission of vibrations from the base to the body 10. Since the present mounting is suitable for use with a great variety of machinery, apparatus, mechanisms, units other than machinery as such, and devices, small or large, the schematic showing of the body 10 should be considered in its broadest generic sense. Although shown as polygonal, the body 10 may be of any shape. Similar remarks apply to the base 11 which may comprise a special rigid base structure or may be simply a floor upon which the body 10 is to be supported.

In the present instance, and merely by way of example, the body 10 is shown in Figure 2 as including a rotary device 12, such as a centrifugal drum therein extending from front to back and supporting a mass of material M to be processed in some way in the rotation of the rotor 12 and providing an eccentric load variable as to location and magnitude. More specifically, the body 10 may comprise a garment-treating machine such as a dry-cleaning or washing machine and which may be broadly referred to as a textile treating machine in which the mass of material M may comprise garments to be centrifugally dried by spinning the rotor 12 at relatively high speeds. It was with such a machine that the present invention was first successfully operated. As it was originally mounted, the machine was on a three-ton steel base which vibrated so badly when the machine was in operation that the base "walked" around on a concrete floor with a great clatter. After being remounted upon a vibration absorbing mount or support according to the present invention, the same machine operates quietly on an ordinary wooden floor with practically no vibration perceptibly transmitted to the floor.

These advantageous results are obtained by resiliently supporting the body 10 in such a manner that it is permitted to move in any direction against small elastic restraint. To this end, resilient primary supporting means are provided which will carry the static load of the body 10. Ordinary helically coiled compression spring units 13 are shown herein as representative of such means and upon which the machine is adapted to rest. One of the spring units 13 is located adjacent to each of the opposite ends of the body 10 or at the respective opposite sides of the machine so that the axis of the drum 12 extends transversely therebetween. The springs 13 have their axes centered with respect to a vertical plane through one horizontal axis of the horizontally spaced body 10, herein the longitudinal vertical center plane of the body. The body 10 and the base 11 may be provided with respective coaxial centering bosses 14 and 15 fitting into the ends of the respective springs 13.

With such a resilient mounting as provided by the springs 13, the body 10 may move in any direction, up and down, endwise, sidewise, and rockably about either horizontal axis or swing about its vertical axis. In other words, it can move in any linear or pitching direction in the presence of forces capable of overcoming its inertia, such, for example, as the unbalanced centrifugal forces created by the mass M upon rotation of the rotor 12. To this extent, therefore, the primary mounting afforded by the springs 13 is relatively unstable. That is, the springs 13 have a high load sustaining and vertical vibration absorption capacity but relatively low horizontal and pitch vibration control capacity.

The requisite stability for the body 10 is afforded by motion control means including a substantially vertically guided pivotal connection between the mounting means or base 11 and the body 10 and the drum 12 for relative pivotal movement of the drum about an axis parallel to the drum axis whereby the machine is free to move bodily vertically and is free to oscillate about said pivotal connection, and means cooperating with said vertically guided pivotal connection to synchronize vertical movements of corresponding portions of the front and back of the machine and thus prevent substantial fore and aft rocking movement of the drum axis. To this end there is provided a stabilizer unit 17 which is of such construction and arrangement that it permits relative movement between the body 10 and the base 11 within ample limits and under a relatively low order but nevertheless effective elastic restraint upon pitching and horizontal vibration.

The stabilizer unit 17 is located below the body 10 and for convenience is constructed to be operative in the head room afforded by the space below the body 10. In one efficient form, the stabilizer 17 comprises a torque frame 18 which is preferably of an effective length approximately equaling the width of the body 10 and of a width determined by the size and deflectional requirements of the installation. The frame 18 may be constructed in any preferred fashion, of structural iron or as a casting, and is of such strength and rigidity as will amply meet the stress requirements of the installation. The front and back portions of the frame 18 may be considered as link means between the base 11 and the machine 10 extending pivotally between the base and the machine to guide the latter vertically and to permit oscillation thereof about a central axis lying beneath the drum ends. The portions of the frame 18 extending from front to back of the machine comprise torsion means acting between the front and rear link means to synchronize vertical movements of corresponding portions of the front and back of the machines.

Adjacent to one of its sides the frame 18 is resiliently secured adjacent to the front and back of the machine body 10 in the vertical plane of the transverse axis through the mean center of mass of the latter, and parallel to the axis of the drum, and disposed in spaced relation below the body 10 and also in spaced relation above the base 11. Suitable means for this purpose comprise fixed depending brackets 19 at the respective opposite sides of the body 10 to which coaxial trunnion-like endwise extensions 20 on the frame 18 are connected by respective coaxial pivot bearings provided by resilient couplings 21.

In a convenient and effective form the resilient couplings 21 include a universal spring member 22 which may take many different forms, but in the practical form disclosed comprises a body of resilient material such as rubber, natural or synthetic, of undulant diaphragm form bonded to a metal center bushing 23 and a metal peripheral attachment flange ring 24. The bushing 23 is secured fixedly coaxially with the end of the associated extension boss 20 by means such as a screw 25.

The attachment flange 24 is secured to the bracket 19 by means of a spacer body or block 27 and a clamping ring 28 which cooperate to define a housing for the stabilizer trunnion elements and the resilient spring connecting member 22. The hollow spacer block 27 is adapted to be secured to the bracket 19 by means such as screws 29 and is of adequate thickness to support the spring coupling member 22 in fully spaced relation within a central bore 30 and a counterbore 31.

The clamping ring 28 is secured to the spacer block 27 by means such as screws 32 which extend through appropriate apertures 34 in the attachment flange 24 and thereby clamp the flange tightly between the opposing faces of the clamping ring and the spacer block.

At least adjacent to its outer end the clamping ring 28 is formed with a radially inwardly extending limit flange 35 of an internal diameter greater than the diameter of the boss 20 predetermined to afford a clearance which will allow a fair range of more or less normal vibrational movement of the flange 35 relative to the boss 20 as induced by the body 10 and of a magnitude which is within desirable limits. Movements of greater magnitude are positively restrained by solid engagement of the flange 35 with the boss 20 or the head of the screw 25 with the bracket 19.

Hence, it will be apparent that within a substantial vibrational range the body 10 is free to move in any direction after its mass inertia is overcome, and such vibrational movement will be resiliently restrained by the supporting springs 13 and the coupling springs 22. Since the primary supporting springs 13 from their nature will absorb up and down vibrations effectively and horizontal and pitching vibrations less effectively, the principal vibrational restraint and absorption duty of the coupling springs 22 resides in the pitching and horizontal directions. This function of the coupling springs 22 is enhanced by location thereof as close as practicable to the respective opposite sides of the vibrating body 10.

Although the coupling springs 22 may be, and preferably are, capable of a fair degree of torsional resistance, they are preferably in substantially torsional balance during operation. However, to attain this balance allowance must be made for whatever mean load deflection will occur in the vibrating body 10. For this purpose the stabilizer frame 18 is preferably mounted to compensate for such deflection, being in the present instance disposed in a substantially horizontal plane and with the side thereof remote from the coupling bosses 20 pivotally mounted. The end of the frame 18 adjacent such remote side is provided with trunnions 36 which are journaled in supporting brackets 37 carried by the base 11 adjacent respectively the front and back of the machine along an axis spaced laterally of and parallel to the axis of the pivot bearings provided by the coupling members 21. The distance between the pivotal axis of the trunnions 36 and the axis of the spring coupling bosses 20 should be calculated for any particular installation to be sufficiently great to maintain the torsional strain on the coupling springs 22 at a relatively small value with respect to the vertical load deflection of the vibrating body 10.

Where the load deflections are greater than can reasonably be accommodated by torsional response of the coupling springs 22, the coupling bosses of the stabilizer frame may be pivotally mounted relative to the frame as shown in Figure 6. In this form, the frame 18' may be formed with a longitudinal bore 38 to accommodate a freely rotatable shaft 39 on the ends of which are coupling bosses 20'. The shaft 39 is held against longitudinal displacement relative to the stabilizer frame by means such as cotter pins 40. In this way the coupling spring unit 21 is at all times free from any torsional strain irrespective of load deflection.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a vibration absorbing mount for supporting a body in spaced relation to a base, a resilient primary supporting and vibration absorbing means comprising resilient units having a high load sustaining and vertical vibration absorption capacity but relatively low horizontal and pitch vibration control capacity, and a stabilizer structure including universally resilient coupling means and affording resilient restraint upon pitching and horizontal vibrations, said load sustaining resilient units being disposed in a vertical plane with one horizontal axis of said body, said stabilizer being connected to the vibrating body in a vertical plane with a horizontal axis transverse to the plane in which the resilient units are disposed.

2. In combination in a vibration absorbing mount for a body in spaced relation to a base, a pair of primary supporting spring units disposed between the body and the base in a vertical plane with one centered longitudinal axis of the body and adjacent to respective opposite limits of the body, and a stabilizer structure connected in non-supporting relation between the base and the body in a vertical plane through a centered axis of the body transverse to said one axis.

3. In combination in a vibration absorbing mount for a body in spaced relation to a base, a pair of primary supporting spring units disposed between the body and the base in a vertical plane with one longitudinal axis of the body and adjacent to respective opposite limits of the body, and a stabilizer connected between the base and the body in a vertical plane through an axis of the body transverse to said one axis, said stabilizer including a pivoted frame and a pair of resilient couplings between the stabilizer frame and the body respectively located adjacent to the opposite limits of the body with respect to said transverse axis.

4. In a vibration absorbing mount of the character described, a stabilizer including a frame arranged to be movably supported by a base, and resilient couplings for connecting the stabilizer frame to a body supported in relatively movable relation to said base, said resilient couplings comprising combination diaphragm and torsional spring members.

5. In combination in a vibration absorbing mount for a body in spaced relation to a base, a pair of primary supporting spring units disposed between the body and the base in a vertical plane with one longitudinal axis of the body and adjacent to respective opposite limits of the body, and a stabilizer member comprising a rigid frame arranged to be operatively disposed in a plane spaced from both said body and said base and having its location between the body and base intermediate said spring units, said frame having pivotal connection with the base on an axis transverse to said vertical plane and at spaced points longitudinally of said pivot axis adjacent to the opposite limits of the body transversely to said vertical plane, said frame having a pair of resilient couplings with the body respectively located adjacent to said opposite limits of the body with respect to said vertical plane and disposed in a vertical plane through the rocking axis of the body normal to said first mentioned vertical plane.

6. In combination in a vibration absorbing mount for a body in spaced relation to a base, a pair of primary supporting coil springs, one of which is disposed respectively adjacent to each opposite limit of said body in one direction and with the coil spring axes in a vertical plane with the axis running through said body in said one direction, said springs affording high load sustaining and vertical vibration absorption relationship to the body but relatively low horizontal and pitch vibration control so that the body would be subject to upset from equilibrium in either side of said vertical plane as well as pitching movement and horizontal vibrations, a stabilizer structure for restraining pitching and horizontal vibrations as well as for holding the body against upset from substantially the equilibrium position, and universally resilient coupling means connecting the stabilizer structure and the body, the stabilizer structure thereby being relatively movably connected to said base, said coupling means being disposed in a vertical plane through the load axis normal to the first mentioned axis and respectively adjacent to the opposite limits of the body in the last mentioned plane.

7. In combination a vibration absorbing mount construction, a stabilizer structure including a rigid generally quadrilateral frame arranged to be disposed generally horizontally and in mutually spaced relation between a vibrational body and a base, said frame having coaxial pivotal connection with the base and coaxial pivotal connection with the body on pivotal axes disposed in spaced parallel relation, the pivotal connection with the body comprising coaxial oppositely extending trunnion elements and encircling housings, each of said housings including a radial limit flange normally in coaxial spaced relation to the companion trunnion, and a rubber-like resilient torsional spring and diaphragm member within the housing and secured to the end of the trunnion and to said housing and connecting the end of the trunnion within the housing.

8. In combination a vibration absorbing mount construction, a stabilizer structure including a rigid generally quadrilateral frame arranged to be disposed generally horizontally and in mutually spaced relation between a vibrational body and a base, said frame having coaxial pivotal connection with the base and coaxial pivotal connection with the body on pivotal axes disposed in spaced parallel relation, the pivotal connection with the body comprising coaxial oppositely extending trunnion elements and encircling housings, each of said housings including a radial limit flange normally in coaxial spaced relation to the companion trunnion, and a means secured to the extremity of the trunnion and to the housing and providing a resilient connection between the extremity of the trunnion and the housing.

9. In a textile treating machine, including a centrifugal drum mounted for rotation about a horizontal axis extending from front to back of the machine, mounting means comprising a rigid base, a pair of horizontally spaced compression coil springs disposed thereon and located at each side of the machine so that the axis of said drum extends transversely therebetween, said machine being adapted to rest upon the springs, motion control means including a generally horizontal frame, spaced coaxial pivot bearings adjacent the front and back of the machine pivoting said frame to the machine for relative pivotal movement about an axis parallel to the axis of the drum and lying in approximately the same vertical plane but spaced substantially therebelow, and spaced coaxial pivot bearings adjacent the front and back of the machine pivoting the control frame to the base along an axis spaced laterally of the first mentioned pivotal axis and parallel thereto.

10. In a textile treating machine, including a centrifugal drum mounted for rotation about a horizontal axis extending from front to back of the machine, mounting means comprising a rigid base and spring means disposed thereon, said machine being adapted to rest upon the spring means, motion control means including a generally horizontal frame, spaced coaxial pivot bearings adjacent the front and back of the machine pivoting said frame to the machine for relative pivotal movement about an axis parallel to the axis of the drum, and spaced coaxial pivot bearings adjacent the front and back of the machine pivoting the control frame to the base along an axis spaced laterally of the first mentioned pivotal axis and parallel thereto.

11. In a textile treating machine, including a centrifugal drum for receiving textile articles mounted for rotation about a generally horizontal axis, mounting means comprising a rigid base and spring means disposed thereon, said machine being adapted to rest upon the spring means, motion control means including a substantially vertically guided pivotal connection between the mounting means and the drum for relative pivotal movement of the drum about an axis parallel to the drum axis whereby the machine is free to move bodily vertically and is free to oscillate about said pivotal connection, and means cooperating with said vertically guided pivotal connection to synchronize vertical movements of corresponding portions of the front and back of the machine and thus prevent substantial fore and aft rocking movement of the drum axis.

12. In a textile treating machine, including a centrifugal drum for receiving textile articles mounted for rotation about a generally horizontal axis, mounting means comprising a rigid base and spring means disposed thereon, said machine being adapted to rest upon the spring means, motion control means including link means at the front and rear of the machine and acting pivotally between the base and the machine to guide the latter vertically and to permit oscillation thereof about a central axis lying beneath the drum axis, and torsion means extending from front to back of the machine and acting between the front and rear link means to synchronize vertical movements of corresponding portions of the front and back of the machine.

13. In a textile treating machine, including a centrifugal drum mounted for rotation about a horizontal axis extending from front to back of the machine, mounting means comprising a rigid base, a pair of horizontally spaced compression coil springs disposed thereon and located at each side of the machine so that the axis of said drum extends transversely therebetween, said machine being adapted to rest upon the springs, motion control means including a generally horizontal frame, spaced coaxial pivot bearings adjacent the front and back of the machine pivoting said frame to the machine for relative pivotal movement about an axis parallel to the axis of the drum, and spaced coaxial pivot bearings adjacent to the front and back of the machine pivoting the control frame to the base along an axis spaced laterally of the first mentioned pivotal axis and parallel thereto.

14. In a textile treating machine including a centrifugal drum mounted for rotation about a horizontal axis extending from front to back of the machine, mounting means comprising a rigid base, a pair of horizontally spaced spring means disposed thereon and located at each side of the machine so that the axis of said drum extends transversely therebetween, said machine being adapted to rest upon the spring means, motion control means including a generally horizontal frame, spaced coaxial pivot bearings adjacent the front and back of the machine pivoting said frame to the machine for relative pivotal movement about an axis parallel to the axis of the drum and lying in approximately the same vertical plane but spaced substantially therebelow, and spaced coaxial pivot bearings adjacent the front and back of the machine pivoting the control frame to the base along an axis spaced laterally of the first mentioned pivotal axis and parallel thereto.

15. In a textile treating machine, including a centrifugal drum mounted for rotation about a horizontal axis extending from front to back of the machine, mounting means comprising a rigid base, a pair of horizontally spaced spring means disposed thereon and located at each side of the machine so that the axis of said drum extends transversely therebetween, said machine being adapted to rest upon the spring means, motion control means including a generally horizontal frame, spaced coaxial pivot bearings adjacent the front and back of the machine pivoting said frame to the machine for relative pivotal movement about an axis parallel to the axis of the drum, and spaced coaxial pivot bearings adjacent the front and back of the machine pivoting the control frame to the base along an axis spaced laterally of the first mentioned pivotal axis and parallel thereto.

16. In a textile treating machine including a centrifugal drum mounted for rotation about a horizontal axis extending from front to back of the machine, mounting means comprising a rigid base and spring means disposed thereon, said machine being adapted to rest upon the spring means, motion control means including a generally horizontal frame, spaced coaxial pivot bearings adjacent the front and back of the machine pivoting said frame to the machine for relative pivotal movement about an axis parallel to the axis of the drum and lying in approximately the same vertical plane but spaced substantially therebelow, and spaced coaxial pivot bearings adjacent the front and back of the machine pivoting the control frame to the base along an axis spaced laterally of the first mentioned pivotal axis and parallel thereto.

17. In a textile treating machine, including a centrifugal drum for receiving textile articles mounted for rotation about a generally horizontal axis, mounting means comprising a rigid base and spring means disposed thereon, said machine being adapted to rest upon the spring means, motion control means including a substantially vertically guided pivotal connection engaging the machine at a point substantially directly beneath the drum axis whereby the machine is free to move bodily vertically and is free to oscillate about said pivotal connection, and means cooperating with said vertically guided pivotal connection to synchronize vertical movements of corresponding portions of the front and back of the machine.

BERNARD E. O'CONNOR.

References Cited in the file of this patent

UNITED STATES PATENTS

| Number | Name | Date |
|---|---|---|
| 438,941 | Pepple | Oct. 21, 1890 |
| 1,398,810 | Story | Nov. 29, 1921 |
| 1,781,161 | Carrey | Nov. 11, 1930 |
| 1,980,136 | Howe | Nov. 6, 1934 |
| 2,093,930 | Rosenzweig | Sept. 21, 1937 |

FOREIGN PATENTS

| Number | Country | Date |
|---|---|---|
| 331,813 | Germany | Jan. 13, 1921 |
| 497,189 | Germany | May 5, 1930 |